United States Patent
Lehtonen

(10) Patent No.: US 6,603,515 B2
(45) Date of Patent: *Aug. 5, 2003

(54) VIDEO DATA TRANSMISSION

(75) Inventor: Erkko Lehtonen, Tampere (FI)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,530

(22) Filed: Aug. 27, 1998

(65) Prior Publication Data

US 2002/0057737 A1 May 16, 2002

(30) Foreign Application Priority Data

Sep. 2, 1997 (FI) .................................................. 973588

(51) Int. Cl.$^7$ .............................. H04N 7/12; H04N 9/78

(52) U.S. Cl. ..................... 348/396.1; 348/663

(58) Field of Search ................. 348/396, 415, 348/14, 17, 19, 488, 489, 663, 662, 645; 358/426, 429; 345/150; 379/93.17, 100.17; 386/31, 44; H04N 7/12

(56) References Cited

U.S. PATENT DOCUMENTS

| | | | | |
|---|---|---|---|---|
| 3,881,054 A | * | 4/1975 | Walla ........................ | 348/673 |
| 4,400,718 A | * | 8/1983 | Lee ............................ | 348/662 |
| 4,910,604 A | * | 3/1990 | Takei et al. ................. | 386/95 |
| 5,321,517 A | * | 6/1994 | Takei et al. ................. | 348/488 |
| 5,389,965 A | * | 2/1995 | Kuzma ....................... | 348/14 |
| 5,392,282 A | | 2/1995 | Kiema ........................ | 370/77 |
| 5,523,860 A | * | 6/1996 | Takei et al. ................. | 348/488 |
| 5,543,939 A | | 8/1996 | Harvey et al. .............. | 358/426 |
| 6,052,676 A | * | 4/2000 | Hekmatpour ............... | 706/11 |

FOREIGN PATENT DOCUMENTS

| | | |
|---|---|---|
| DE | 41 08 798 A1 | 10/1992 |
| EP | 0 424 619 A3 | 5/1991 |
| GB | 2 297 451 A | 7/1996 |
| WO | WO 91/10328 | 7/1991 |
| WO | WO 98/15124 | 4/1998 |

OTHER PUBLICATIONS

Patent Abstracts of Japan, JP 7203408 A.

Patent Abstracts of Japan, JP 7111650 A.

Patent Abstracts of Korea, KR 9502675.

Patent Abstracts of Japan JP 2–239789 A.

Patent Abstracts of Japan JP 2–301283 A.

Patent Abstracts of Japan JP 2–14691 A.

Patent Abstracts of Japan JP 5–316501 A.

PCT International Search Report.

* cited by examiner

*Primary Examiner*—Gims S. Philippe
(74) *Attorney, Agent, or Firm*—Perman & Green, LLP

(57) ABSTRACT

A video data transmission system in which a transmission terminal (1) having a color camera (4) is required to transmit video information to a reception terminal (3) having only a black and white display (7). In order to minimise the transmission bit-rate, during a set-up process the reception terminal (3) sends a "LuminanceOnly" flag to the transmission terminal (1) advising the transmission terminal to send only the luminance component of the video signal generated by the color camera (4). The chrominance components generated by the camera (4) are either discarded or encoded as null data prior to transmission.

12 Claims, 1 Drawing Sheet

VIDEO DATA TRANSMISSION

FIELD OF THE INVENTION

The present invention relates to video data transmission and is applicable in particular, though not necessarily, to video telephony.

BACKGROUND OF THE INVENTION

There are many applications in which the high speed transmission of video data is required. Demand is expected to rise in particular for video telephony services (including video conferencing) over the next few years. With a view to anticipating this expected rise in demand, and also increased demand for other services which require the transmission of video data, the International Telecommunications Union (ITU) is presently laying down new standards in this area. In particular, the Telecommunication Standardisation Sector of ITU (known as ITU-T) has produced a number of draft recommendations, as a precursor to international standards, relating to the point-to-point transmission of video data (and for example available at internet address "ftp://standards.pictel.com").

ITU-T recommendation H.324 defines a terminal for low bit rate multimedia communication. H.324 terminals may carry real-time voice, data and video, or any combination thereof and may be integrated into personal computers or implemented in stand-alone devices such as video telephones. The H.324 recommendation incorporates a number of other ITU-T recommendations and is intended to maximise the interworking of terminals which will meet the standard which will result from this recommendation.

The recommendations which are incorporated into H.324 include:
recommendation H.261 which specifies inter alia the processing and coding of colour format images comprising luminance (Y) and chrominance (U,V) components;
recommendation H.263 which specifies a coded representation (video codec) which can be used for compressing and decompressing the moving picture component of an audio-visual transmission (including H.261 format image data) and which meets the low bit rate requirement; and
recommendation H.245 which specifies the protocol for exchanging audio-visual and data capabilities between two connected terminals and defines the properties of the transmission channel and the properties of the transmitted data.

SUMMARY OF THE INVENTION

There is an ongoing desire to reduce still further the bit-rate required for video data transmission in order to increase transmission channel capacity and to reduce data processing requirements. The present invention provides for such a reduction by transmitting only the luminance (Y), i.e. black and white, component of a video signal, and omitting the chrominance (U,V), i.e. colour, components when a receiving terminal has the ability, or is set, to display only black and white images.

According to a first aspect of the present invention there is provided a method of transmitting video data from a first to a second terminal over a transmission channel, the method comprising the steps of:
  providing at said first terminal a video signal having luminance (Y) and chrominance components (U,V);
  in the event that chrominance components are not required by the second terminal, transmitting from the second terminal to the first terminal a control message indicating that only the luminance (Y) component of said video signal should be transmitted to the second terminal; and
  subsequent to receipt of said control message at the first terminal, transmitting from the first terminal to the second terminal only the luminance component (Y) of the video signal.

The present invention results at least in part from the realisation that, where a receiving terminal is only capable of displaying black and white images, chrominance component signals (U,V) sent to the receiving terminal represent redundant information. By omitting the chrominance components from the transmitted video data, valuable transmission capacity can be freed for other uses.

Preferably, the method comprises encoding said video data at said first terminal, prior to transmission, using a video encoder. More preferably, the step of encoding provides for the compression of the video data. Encoded data is decoded at the second terminal by a video decoder.

In a first embodiment of the present invention, the luminance (Y) and chrominance components (U,V) of the video signal are provided to the video encoder. However, the video encoder encodes only the luminance component (Y). No chrominance signals are encoded or transmitted.

In a second embodiment of the present invention, both chrominance and luminance components (Y,U,V) of the video signal are provided to the video encoder. The video encoder then encodes the chrominance components (U,V) as if they were null signals. Where the data is encoded with a technique such as variable length coding, the null data can be greatly compressed and does not significantly add to the volume of transmitted video data. The video data received at the second terminal is processed by a video decoder to provide the luminance component (Y) and the null chrominance components (U,V). The latter are then discarded and only the luminance component is retained. An advantage of this embodiment is that, whilst the video encoder at the first terminal requires to recognise that luminance only transmission is required, the decoder at the second terminal does not.

In a third embodiment of the present invention, the chrominance components (U,V) are replaced by null signals prior to providing them to the video encoder. The encoder then encodes the null chrominance signals, together with the luminance component (Y), and transmits the encoded data. This allows an otherwise standard encoder to be used. Similarly, a standard decoder may be used at the second terminal.

Preferably, the method comprises using a colour video camera to provide said video signal to the first terminal, and providing the transmitted luminance component to a black and white display coupled to the second terminal.

The method of the present invention may comprise the step of transmitting a further control message, from the second to the first terminal, subsequent to the transmission of the first mentioned control message, indicating that the luminance (Y) and chrominance (U,V) components of said video signal should be transmitted to the second terminal. Thereafter, all of these components are transmitted. This may be appropriate, where the second terminal has both black and white and colour display capabilities, but where there is from time to time a need to reduce the transmission bandwidth.

According to a second aspect of the present invention there is provided apparatus for transmitting video data over a transmission channel, the apparatus comprising:
  a first terminal arranged to receive a video signal having luminance (Y) and chrominance components (U,V); and a second terminal arranged to transmit therefrom, to said first terminal, a control message indicating that only the luminance (Y) component of said video signal should be transmitted to the second terminal, said first terminal being further arranged to transmit to the second terminal only the luminance component (Y) of the video signal, subsequent to receipt of said control message.

According to a third aspect of the present invention there is provided a receiving terminal for use in the video data transmission apparatus of the above second aspect of the present invention, the terminal being arranged to transmit therefrom, to a remote terminal, a control message indicating that only the luminance (Y) component of said video signal should be transmitted from the remote terminal to the receiving terminal.

According to a fourth aspect of the present invention there is provided a transmitting terminal for use in the video data transmission apparatus of the above second aspect of the present invention, the terminal being arranged to receive a video signal having luminance (Y) and chrominance components (U,V), to receive a control message, from a remote terminal, indicating that only the luminance (Y) component of said video signal should be transmitted from the transmitting terminal to the remote terminal, said transmitting terminal being further arranged to transmit to the remote terminal only the luminance component (Y) of the video signal, subsequent to receipt of said control message.

According to a fifth aspect of the present invention there is provided a video data transmission unit comprising, in combination, a terminal according to the above third aspect of the present invention and a terminal according to the above fourth aspect of the present invention.

According to a sixth aspect of the present invention there is provided a method of transmitting video data between a first and a second terminal over a transmission channel, the method comprising the steps of:

exchanging flags between the first and second terminals to notify each terminal of the capability of the other terminal to transmit and receive image data with and without chrominance components;

transmitting video data from the first to the second terminal, and/or vice versa, on the basis of the exchanged flags.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION

Figure 1:
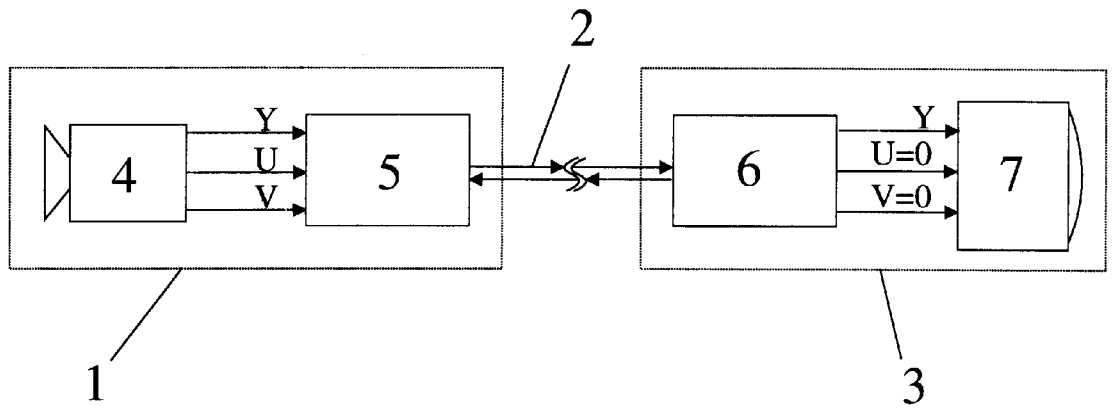
FIG. 1 shows schematically a video data transmission system in which only a luminance component of a video signal is encoded and transmitted.

A video transmission system is illustrated in FIG. 1 and comprises a transmission terminal 1, a data transmission channel 2, and a reception terminal 3. Both the transmission and reception terminals conform generally to the ITU-T recommendation H.263 whilst the transmission channel may be a wireless channel, a coaxial cable, a fibre optic cable, or any other suitable means.

The transmission terminal 1 has a colour video camera 4 which generates a video signal comprising luminance (Y) and chrominance (U,V) components in accordance with recommendation H.263. As will be known to the skilled person, the luminance component (Y) contains the tone information of a video image, i.e. the amount of black and white in the image, whilst the chrominance components (U,V) contain the colour information. The transmission terminal 1 also comprises an encoder 5 which is capable of encoding the luminance and chrominance signals generated by the colour video camera 4 into a form suitable for transmission via the transmission channel 2. Encoding involves compressing the video signals to reduce the transmission bit-rate.

The reception terminal 3 comprises a video decoder 6 which receives the encoded video information transmitted over the transmission channel 2 and decodes this information into separate chrominance and luminance components for transmission to a video display 7.

As has been described above, ITU-T recommendation H.245 specifies the set-up signalling routine which occurs between two H.263 terminals prior to transmission of video data. With the system of FIG. 1, the H.245 recommendation is modified so that during the capabilities exchange a "LuminanceOnly" boolean flag is included in the existing "H.263receiveVideoCapability" field. More particularly, this flag is sent from the reception terminal 3 to the transmission terminal 1, and is set to FALSE if the display 7 of the reception terminal 3 is a colour display and is set to TRUE if the display 7 is a black and white display.

The encoder 5 of the transmission terminal 1 implements the H.263 recommendation, or a modified version of that recommendation, depending upon the value of the "LuminanceOnly" flag. If the flag is set to FALSE, indicating that the reception terminal 3 has a colour display capability, the chrominance and luminance components (Y,U,V) of the video signal are all encoded and are prepared for transmission to the reception terminal. However, in the event that the "LuminanceOnly" flag is set to TRUE, the encoder 5 rejects the chrominance components (U,V) and encodes only the luminance component (Y). Only the encoded luminance component is transmitted resulting in a reduction in the data to be transmitted of some 10 to 20%. The decoder 6 of the reception terminal 3 is similarly modified over the H.263 recommendation so that, in the event that the "LuminanceOnly" flag is set to TRUE, it knows that only the luminance component will be transmitted. This situation is illustrated in FIG. 1 where only the luminance component (Y) is provided from the decoder 6 to the display 7, the chrominance components having a null (or '0' value).

Figure 2:
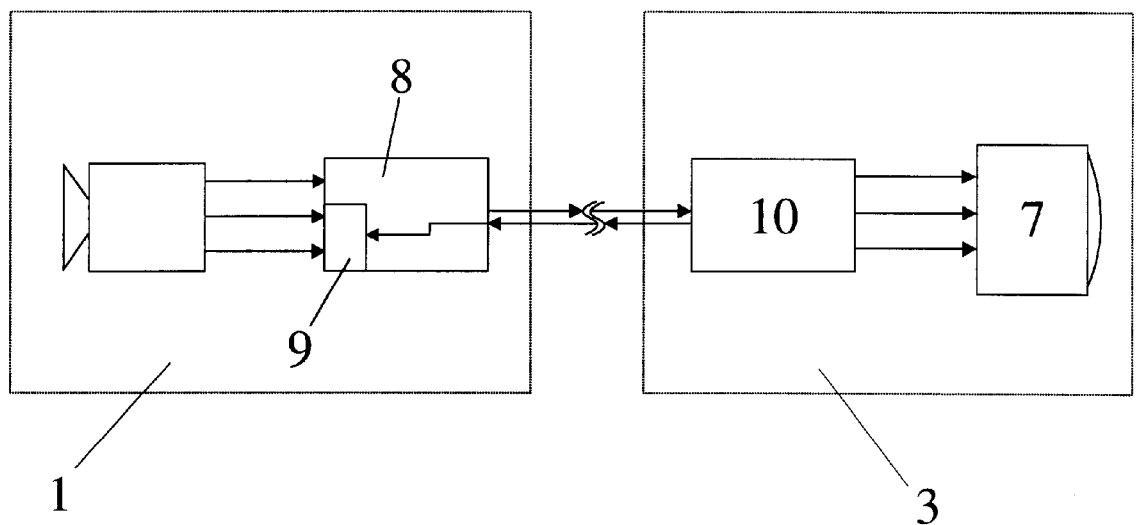
FIG. 2 shows schematically a video data transmission system in which chrominance components of a video signal are provided to an encoder where they are encoded as null signals for transmission with a luminance component.

An alternative video data transmission system is illustrated in FIG. 2, where like features are identified by the same numerals as used in FIG. 1. The transmission terminal 1 comprises an encoder 8 which has a selection module 9 which receives the "LuminanceOnly" flag sent by the reception terminal. When the flag is set to FALSE, the selection module 9 routes both the luminance and chrominance components to the main encoder module which operates in accordance with the existing H.263 recommendation to encode both the luminance and chrominance components of the video signal. When the "LuminanceOnly" flag is set to TRUE, the selection module 9 causes null signals to be substituted for the two chrominance components. These null signals are encoded together with the luminance component, to generate an encoded video signal for transmission.

It will be appreciated that the format of the transmitted signal is the same regardless of the state of the "LuminanceOnly" flag. Therefore, the decoder 10 of the reception terminal 3 can be in accordance with the existing H.263 recommendation. It will be appreciated that, because the chrominance signals are replaced by null signals when the "LuminanceOnly" is set to TRUE, significant compression of these signals can be carried out in the encoder 8 of the transmission terminal 1. For example, encoding techniques which use variable length coding will significantly compress the null signals.

Figure 3:
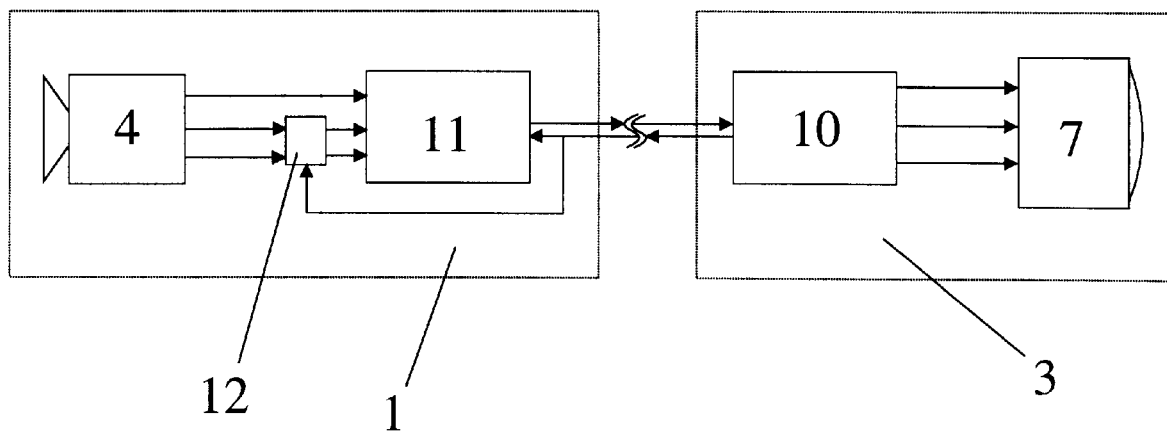
FIG. 3 shows schematically a video data transmission system in which null signals are substituted for chrominance components, and the null signals together with a luminance component are provided to an encoder for encoding prior to transmission.

FIG. 3 illustrates a video information transmission system in which both the encoder 11 of the transmission terminal 1 and the decoder 10 of the reception terminal 3 may be in accordance with the existing H.263 recommendation. This is made possible by adding a switch 12, external to the encoder 11, through which the chrominance signals (U,V) are coupled from the camera 4 to the encoder 11 of the transmission terminal 1. This switch 12 also receives the "LuminanceOnly" flag and performs in effect the same function as the selection module 9 described with reference to FIG. 1 so that the chrominance components (U,V) are replaced by null signals when the "LuminanceOnly" flag is set to TRUE. The switch 12 may be implemented in hardware or in software.

It will be appreciated that modifications may be made to the above described embodiments without departing from the scope of the present invention. For example, whilst the embodiments above relate to the uni-directional transmission of video information, the present invention may be used in bi-directional transmission where a reception and transmission terminal, in a single unit (e.g. a videophone), are provided at both ends of the communication channel. In this case, the encoder and decoder at each end may be provided by a single H.263 codec and the H.245 recommendation will define a set-up routine in which there is an exchange of "LuminanceOnly" flags (in respective "receiveVideoCapability" fields) between the two ends of the transmission channel for the purpose of indicating the reception capabilities of both terminals.

In order to maximise the interworking of terminals, the H.245 capability exchange recommendation may be further modified to add a "LuminanceOnly" flag to the "transmitVideoCapability" field, sent from the transmitting to the receiving terminal (where both terminals have transmit and receive capabilities this field is sent in both directions), and which indicates whether or not the transmitting terminal is capable of transmitting only the luminance component. This situation may arise, for example, where the encoder of the transmitting terminal is not able to reject the chrominance components and the receiving terminal requires this information to select a suitable decoder. It will therefore be apparent that the meaning of the truth value assigned to the "LuminanceOnly" flag depends upon whether the flag belongs to the receiveVideoCapability or transmitVideoCapability field, i.e.:

In the "H.263transmitVideoCapability" field, "LuminanceOnly"=TRUE means that the transmitting terminal is capable of encoding only the luminance component according to, for example, the method of FIGS. 1, 2 or 3;

In the "H.263transmitVideoCapability" field, "LuminanceOnly"=FALSE means that the transmitting terminal is not capable of encoding only the luminance component;

In the "H.263receiveVideoCapability" field, "LuminanceOnly"=TRUE means that the receiving terminal is capable of receiving the modified H.263 bit stream of, for example, the method FIG. 1;

In the "H.263receiveVideoCapability" field, "LuminanceOnly"=FALSE means that the receiving terminal is not capable of receiving the modified H.263 bit stream of the method of, for example, FIG. 1.

Furthermore, following the capabilities exchange, actual transmission may be commenced by the sending of a transmit request message from the receiving terminal to the transmitting terminal. This message is the "H.263VideoCapability" field and again contains a "LuminanceOnly" flag. This flag indicates whether or not the transmitting terminal should transmit a luminance only signal and is set depending upon the (already exchanged) capabilities of the two terminals and also upon other factors such as available channel capacity. The transmitting terminal responds by either accepting the request ("RequestModeAck") or rejecting the request ("RequestModeReject").

It will also be appreciated that the invention may be implemented either in hardware or software (e.g. using a digital signal processor), or in a combination of hardware and software.

What is claimed is:

1. A method of transmitting video data from a first to a second terminal over a transmission channel, the method comprising the steps of:

providing at said first terminal a video signal having luminance (Y) and chrominance components (U.V);

in the event that chrominance components are not required by the second terminal, transmitting from the second terminal to the first terminal, on a control protocol connection established therebetween, a control message indicating that only the luminance (Y) component of said video signal should be transmitted to the second terminal; and upon receipt of said control message at the first terminal, transmitting from the first terminal to the second terminal only the luminance component (Y) of the video signal.

2. A method according to claim 1 and comprising encoding said video data at said first terminal, prior to transmission, using a video encoder and decoding the encoded data at the second terminal using a video decoder.

3. A method according to claim 2, wherein the luminance (Y) and chrominance components (U,V) of the video signal are provided to the video encoder and the video encoder encodes only the luminance component (Y).

4. A method according to claim 1 wherein both chrominance and luminance components (Y,U,V) of the video signal are provided to the video encoder and the video encoder encodes the chrominance components (U,V) as if they were null signals.

5. A method according to claim 1, wherein the chrominance components (U,V) are replaced by null signals prior to providing them to video encoder, the encoder then encoding the null chrominance signals, together with the luminance component (Y), and transmitting the encoded data.

6. A method according to claim 1 and comprising using a color video camera to provide said video signal to the first terminal, and providing the transmitted luminance component to a black and white display coupled to the second terminal.

7. A method according to claim 1 and comprising transmitting a further control message, from the second to the first terminal, subsequent to the transmission of the first mentioned control message, indicating that the luminance (Y) and chrominance (U,V) components of said video signal should be transmitted to the second terminal.

8. Apparatus for transmitting video data over a transmission channel (2), the apparatus comprising:
- a first terminal (1) arranged to receive a video signal having luminance (Y) and chrominance components (U,V); and
- a second terminal (3) arranged to transmit therefrom, to said first terminal (1) on a control protocol connection established therebetween, a control message indicating that only the luminance (Y) component of said video signal should be transmitted to the second terminal (3), said first terminal (1) being further arranged to transmit to the second terminal only the luminance component (Y) of the video signal, upon receipt of said control message.

9. A receiving terminal for use in the video data transmission apparatus of claim 8, the terminal (3) being arranged to transmit therefrom, to a remote terminal (1), a control message indicating that only the luminance (Y) component of said video signal should be transmitted from the remote terminal (1) to the receiving terminal (3).

10. A transmitting terminal for use in the video data transmission apparatus of claim 8, the terminal (1) being arranged to receive a video signal having luminance (Y) and chrominance components (U,V), to receive a control message from a remote terminal (3) indicating that only the luminance (Y) component of said video signal should be transmitted from the transmitting terminal (1) to the remote terminal (3), said transmitting terminal (1) being further arranged to transmit to the remote terminal (3) only the luminance component (Y) of the video signal, upon receipt of said control message.

11. A video data transmission unit comprising according, to claim 9, wherein the terminal (1) being arranged to receive a video signal having luminance (Y) and chrominance components (U, V) to receive a control message from a remote terminal (3) indicating that only the luminance (Y) component of said video signal should be transmitted from the transmitting terminal (1) to the remote terminal (3) said transmitting terminal (1) being further arranged to transmit to the remote terminal (3) only the luminance components (Y) of the video signal, upon receipt of said control message.

12. A method of transmitting video data between a first and a second terminal over a transmission channel, the method comprising the steps of:
- exchanging flags between the first and second terminals, on a control protocol connection established therebetween, to notify each terminal of the capability of the other terminal to transmit and receive image data with and without chrominance components; and
- transmitting video data from the first to the second terminal, and/or vice versa, on the basis of the exchanged flags.

* * * * *